United States Patent
Zdepski et al.

(10) Patent No.: US 6,445,738 B1
(45) Date of Patent: Sep. 3, 2002

(54) SYSTEM AND METHOD FOR CREATING TRICK PLAY VIDEO STREAMS FROM A COMPRESSED NORMAL PLAY VIDEO BITSTREAM

(75) Inventors: Joel Zdepski; Rama Kalluri, both of Mountain View; Howard Page, Burlingame; Wolf-Hasso Kaubisch, Palo Alto, all of CA (US)

(73) Assignee: OpenTV, Inc., Mountain View, CA (US)

( * ) Notice: Subject to any disclaimer, the term of this patent is extended or adjusted under 35 U.S.C. 154(b) by 969 days.

(21) Appl. No.: 08/639,284

(22) Filed: Apr. 25, 1996

(51) Int. Cl.[7] .................................................. H04N 7/24
(52) U.S. Cl. ...................... 375/240.01; 386/68; 386/111
(58) Field of Search ............................... 348/7, 8, 384, 348/390, 439; 386/6–8, 68, 81–82, 107, 109, 111–112, 123; 369/275.3; 375/240.01, 240.12–240.16; H04N 7/130, 7/24

(56) References Cited

U.S. PATENT DOCUMENTS

| | | | | |
|---|---|---|---|---|
| 5,414,455 A | * | 5/1995 | Hooper et al. | 348/7 |
| 5,477,397 A | * | 12/1995 | Naimpally et al. | 386/123 |
| 5,568,274 A | * | 10/1996 | Fujinami et al. | 386/107 |
| 5,596,564 A | * | 1/1997 | Fukushima et al. | 369/275.3 |
| 5,621,840 A | * | 4/1997 | Kawamura et al. | 386/68 |
| 5,623,344 A | * | 4/1997 | Lane et al. | 386/81 |

FOREIGN PATENT DOCUMENTS

| | | |
|---|---|---|
| DE | 195 13 772 A1 | 4/1995 |
| EP | 0 613 297 A2 | 8/1994 |
| WO | 95/28706 | 10/1995 |

* cited by examiner

Primary Examiner—Richard Lee
(74) Attorney, Agent, or Firm—Conley, Rose & Tayon, P.C.; Rory D. Rankin

(57) ABSTRACT

A system and method for generating trick play video streams, such as fast forward and fast reverse video streams, from an MPEG compressed normal play bitstream. The system receives a compressed normal play bitstream and filters the bitstream by extracting and saving only portions of the bitstream. The system preferably extracts I-frames and sequence headers, including all weighting matrices, from the MPEG bitstream and stores this information in a new file. The system then assembles or collates the filtered data into the proper order to generate a single assembled bitstream. The system also ensures that the weighting matrixes properly correspond to the respective I-frames. This produces a bitstream comprised of a plurality of sequence headers and I-frames. This assembled bitstream is MPEG-2 decoded to produce a new video sequence which comprises only one out of every X pictures of the original, uncompressed normal play bitstream. This output picture stream is then re-encoded with respective MPEG parameters desired for the trickplay stream, thus producing a trickplay stream that is a valid MPEG encoded stream, but which includes only one of every X frames. The present invention thus generates compressed trick play video streams which require reduced storage and reduced data transfer bandwidth requirements.

31 Claims, 9 Drawing Sheets

FILTER OPERATION

VERIFIER/FIXER OPERATION

ALTERNATE EMBODIMENT

SYSTEM AND METHOD FOR CREATING TRICK PLAY VIDEO STREAMS FROM A COMPRESSED NORMAL PLAY VIDEO BITSTREAM

INCORPORATION BY REFERENCE

The following references are hereby incorporated by reference.

The ISO/IEC MPEG specification referred to as ISO/IEC 13818 is hereby incorporated by reference in its entirety.

1. Field of the Invention

The present invention relates generally to video-on-demand systems and video compression, and more particularly to a system and method for creating compressed fast forward and fast reverse video bitstreams from a normal play compressed video bitstream.

2. Description of the Related Art

Video-on-demand systems enable a plurality of users or viewers to selectively watch movies or other audio/video sequences which are stored on one or more video servers or media servers. The video servers are connected through data transfer channels, such as a broadcast network, to the plurality of users. For example, the video servers may be connected through a broadcast cable system or satellite broadcast system to a plurality of users or subscribers. The video servers store a plurality of movies or other audio/video sequences, and each user can select one or more movies from the video servers for viewing. Each user includes a television or other viewing device, as well as associated decoding logic, for selecting and viewing desired movies. When a user selects a movie, the selected movie is then transferred on one of the data transfer channels to the television of the respective user.

Full-motion digital video requires a large amount of storage and data transfer bandwidth. Thus, video-on-demand systems use various types of video compression algorithms to reduce the amount of necessary storage and data transfer bandwidth. In general, different video compression methods exist for still graphic images and for full-motion video. Video compression methods for still graphic images or single video frames are referred to as intraframe compression methods, and compression methods for motion video are referred to as interframe compression methods.

Examples of video data compression for still graphic images are RLE (run-length encoding) and JPEG (Joint Photographic Experts Group) compression. The RLE compression method operates by testing for duplicated pixels in a single line of the bit map and storing the number of consecutive duplicate pixels rather than the data for the pixel itself. JPEG compression is a group of related standards that provide either lossless (no image quality degradation) or lossy (imperceptible to severe degradation) compression types. Although JPEG compression was originally designed for the compression of still images rather than video, JPEG compression is used in some motion video applications.

In contrast to compression algorithms for still images, most video compression algorithms are designed to compress full motion video. Video compression algorithms for motion video use a concept referred to as interframe compression, which involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe compression technique described above. MPEG compression uses both motion compensation and discrete cosine transform (DCT) processes and can yield compression ratios of more than 200:1.

The MPEG standard requires that sound be recorded simultaneously with the video data, and the video and audio data are interleaved in a single file to attempt to maintain the video and audio synchronized during playback. The audio data is typically compressed as well, and the MPEG standard specifies an audio compression method such as MPEG Layer II, also known by the Philips trade name of "MUSI-CAM".

In most video sequences, the background remains relatively stable while action takes place in the foreground. The background may move, but large portions of successive frames in a video sequence are redundant. In generating an MPEG stream, an MPEG encoder creates I or Intra frames and P or Predicted frames, as well as B frames. The I frames contain the video data for the entire frame of video and are typically placed every 10 to 15 frames. The P frames only include changes relative to prior I or P frames. Both I and P frames are used as references for subsequent frames. In general, for the frame(s) following an I or P frame, i.e., frames that follow a reference frame, only small portions of these frames are different from the corresponding portions of the respective reference frame. Thus, for these frames, only the differences are captured, compressed and stored.

After the I frames have been created, the MPEG encoder divides each I frame into a grid of 16×16 pixel squares called macro blocks. The respective I frame is divided into macro blocks in order to perform motion compensation. Each of the subsequent pictures after the I frame are also divided into these same macro blocks. The encoder then searches for an exact, or near exact, match between the reference picture macro block and those in succeeding pictures. When a match is found, the encoder transmits a vector movement code or motion vector. The vector movement code or motion vector only includes information on the difference between the I frame and the respective succeeding picture. The blocks in succeeding pictures that have no change relative to the block in the reference picture or I frame are ignored. Thus the amount of data that is actually stored for these frames is significantly reduced.

After motion vectors have been generated, the encoder then tracks the changes using spatial redundancy. Thus, after finding the changes in location of the macro blocks, the MPEG algorithm further reduces the data by describing the difference between corresponding macro blocks. This is accomplished through a math process referred to as the discrete cosine transform or DCT. This process divides the macro block into four sub blocks, seeking out changes in color and brightness. Human perception is more sensitive to brightness changes than color changes. Thus the MPEG algorithm devotes more effort to reducing color space rather than brightness.

An MPEG stream includes three types of pictures, referred to as the Intra (I) frame, the Predicted (P) frame, and the Bi-directional Interpolated (B) frame. Intra frames provide entry points into the file for random access, and are generally only moderately compressed. Predicted frames are encoded with reference to a past frame, i.e., a prior Intra frame or Predicted frame. In general, Predicted frames receive a fairly high amount of compression and are used as references for future Predicted frames. Bi-directional pictures include the greatest amount of compression and require both a past and a future reference in order to be encoded. Bi-directional frames are never used for references for other frames.

Each picture or frame also includes a picture header which identifies the frame and includes information for that frame. The MPEG standard also includes sequence headers which identify the start of a video sequence. Sequence headers are only required once before the beginning of a video sequence. However, the MPEG-2 standard allows a sequence header to be transferred before any I frame or P frame. The sequence header includes information relevant to the video sequence, including the frame rate and picture size, among other information.

MPEG bitstreams used in digital television applications generally include a sequence header before every I frame and P frame. This is necessary to facilitate channel surfing between different video channels, which is an important user requirement. In general, when a user switches to a new channel, the video for the new channel can not be displayed until the next sequence header appears in the bitstream. This is because the sequence header includes important information about the video sequence which is required by the decoder before the sequence can be displayed. If a sequence header were not included before each I frame and/or P frame, then when the user switched to a new channel, the video for the new channel possibly could not be immediately displayed, i.e., the video could not be displayed until the next sequence header.

An MPEG encoded stream also includes weighting matrixes which are used for decoding the I frames in the MPEG bitstream. Each weighting matrix comprises a matrix of coefficients which are applied to different parameters of the Discrete Cosine Transform (DCT) used in encoding the frame. New weighting matrix values are included at the beginning of every video sequence, and these values are used for the respective frames until a subsequent new weighting matrix appears in the MPEG stream. The weighting matrixes are typically included in sequence headers or picture headers. However, weighting matrixes may also be inserted in P or B frames.

Trick Play Streams

In an interactive video-on-demand system, it is greatly desirable for the user to be able to selectively fast forward and/or fast reverse through the movie being watched. Thus, some video-on-demand systems include fast forward and fast reverse streams, referred to as trick play streams, for each movie. When the user desires to fast forward or fast reverse through a movie, the user selects the fast forward or fast reverse option. The respective fast forward or fast reverse trick play stream is then transferred to the user at the appropriate point where the user was watching, thus simulating a fast forward or fast reverse of the movie being watched.

Interactive video-on-demand systems which include trick play streams require methods for generating the trick play streams from a normal play bitstream. One current method for generating fast forward and fast reverse bitstreams from a normal play bitstream includes using a look-up table into multiple streams. The look-up table includes a plurality of indices which reference respective I frames, and the video server attempts to jump from index to index on the fly and play only the I-frame at each jump. In other words, the video server indexes into a look-up table to play only the I-frames for fast forward and fast reverse trick play streams. One problem with this method is that a considerable burden is placed on the video server in performing a table lookup and jumping from index to index on the fly while fast forward or fast reverse is being requested. Further, this method has associated bit rate expansion problems.

Another method that is known to produce trick play fast forward and fast reverse bitstreams is to generate a video stream which does not include the AC coefficients of the DCT, but rather only includes the DC coefficients. This produces a blocky trick play stream and is thus less desirable than other trick play stream generation methods.

Therefore, an improved system and method is desired for efficiently generating trick play video streams, i.e. fast forward and fast reverse video streams, from a compressed normal play bitstream.

SUMMARY OF THE INVENTION

The present invention comprises a system and method for generating trick play video streams, i.e., fast forward and fast reverse video streams, from a compressed normal play bitstream. The present invention efficiently generates compressed trick play video streams which require reduced storage and reduced data transfer bandwidth requirements. The present invention also does not require real time processing of video data, such as index look-ups.

The system first receives a compressed normal play bitstream, which is either stored on a local media or received from a remote location. The system then filters the bitstream by extracting and saving only portions of the bitstream. The system preferably extracts I-frames and sequence headers, including all weighting matrices, from the MPEG bitstream and stores this information in one or more new files. The filtering thus removes or deletes portions of the MPEG data stream, including predicted (P) frames and bi-directional (B) frames.

The system then assembles or collates the filtered data into a forward or reverse order to produce a single assembled bitstream. The system also ensures that the weighting matrixes properly correspond to the respective I-frames. For a fast forward trick play stream, the assembled bitstream comprises the sequence headers, I frames, and respective weighting matrices in the proper time or sequence order as they appeared in the original MPEG stream. For a fast reverse trick play bitstream stream, the system reverses the order of header/I frame groupings or tuples to produce a reverse play stream. This produces an assembled bitstream comprising a plurality of sequence headers and I-frames, including associated weighting matrices.

The assembled bitstream is then MPEG-2 decoded to produce a new video stream. The new video sequence comprises only one of every X pictures or frames of the original, uncompressed normal play bitstream, wherein 1/X is the frequency of I frames in the original, compressed normal play stream. This output picture stream is then re-encoded with MPEG parameters desired for the trickplay stream, thus producing a trickplay stream that is a valid MPEG encoded stream. When this new MPEG encoded trickplay stream is decoded, the result is a fast forward or fast reverse video sequence which includes only one of every X frames of the original, uncompressed normal play bitstream.

Therefore, the present invention more efficiently generates trick play streams from a compressed normal play bitstream. The resulting trick play stream is a valid MPEG encoded stream and thus has reduced storage and data transfer data bandwidth requirements, and this trick play stream can be decoded with known behavior on any MPEG decoder.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
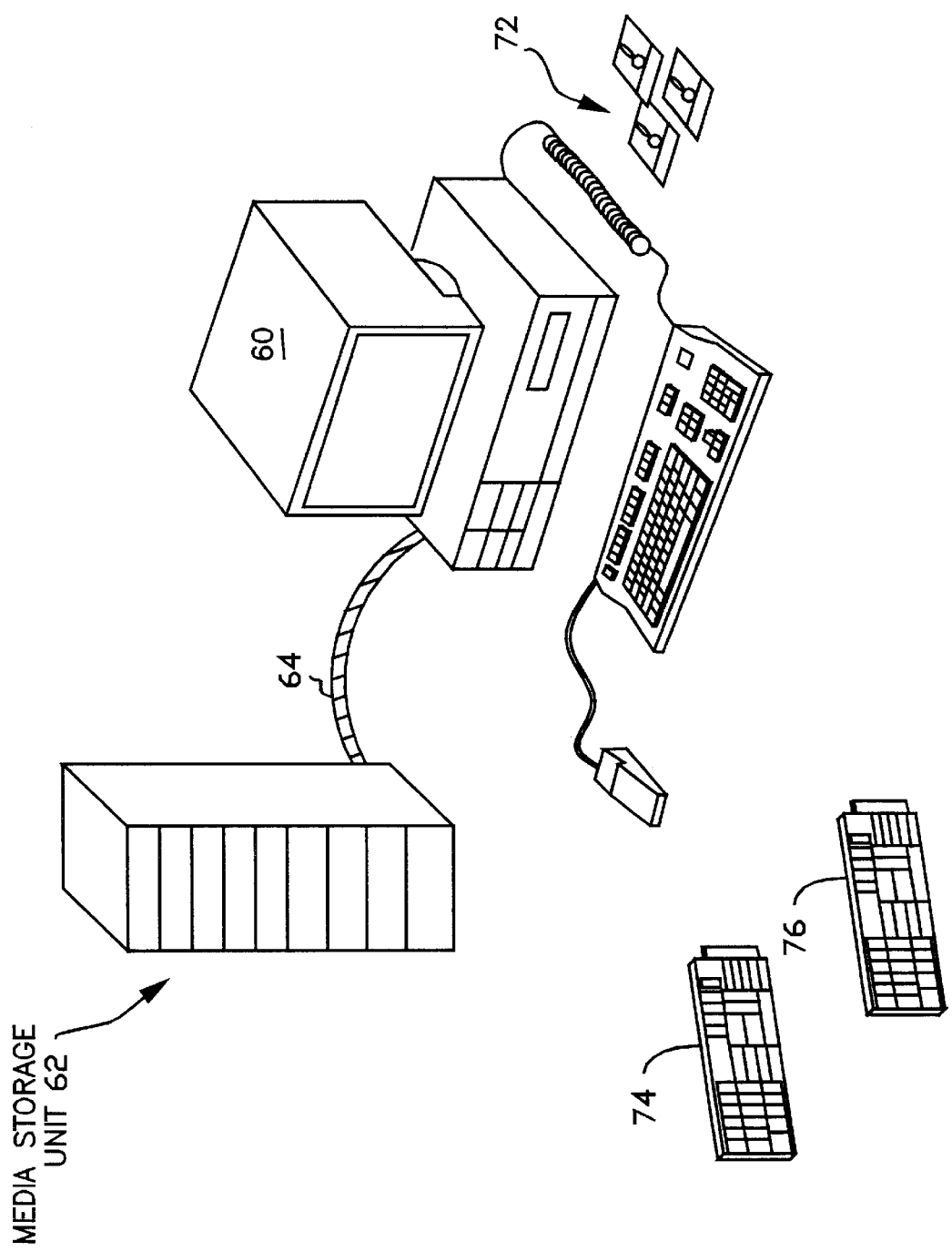
FIGS. 1 illustrates a computer system which generates video trickplay streams according to the present invention.

Referring now to FIG. 1, a system for generating trick play video streams from a compressed normal play bitstream is shown. The system preferably generates trick play streams for use in video-on-demand systems. However, the system of the present invention may be used to generate trick play streams for use in any of various types of applications, as desired.

As shown, in one embodiment the trickplay generation system comprises a general purpose computer system 60. The computer system 60 receives a compressed normal play bitstream and generates one or more trick play streams. In the present disclosure, the term "trick play streams" refers to fast forward and/or fast reverse video streams, preferably compressed streams, which are generated from a normal play bitstream, and which are preferably generated from a compressed normal play bitstream.

Figure 1A:
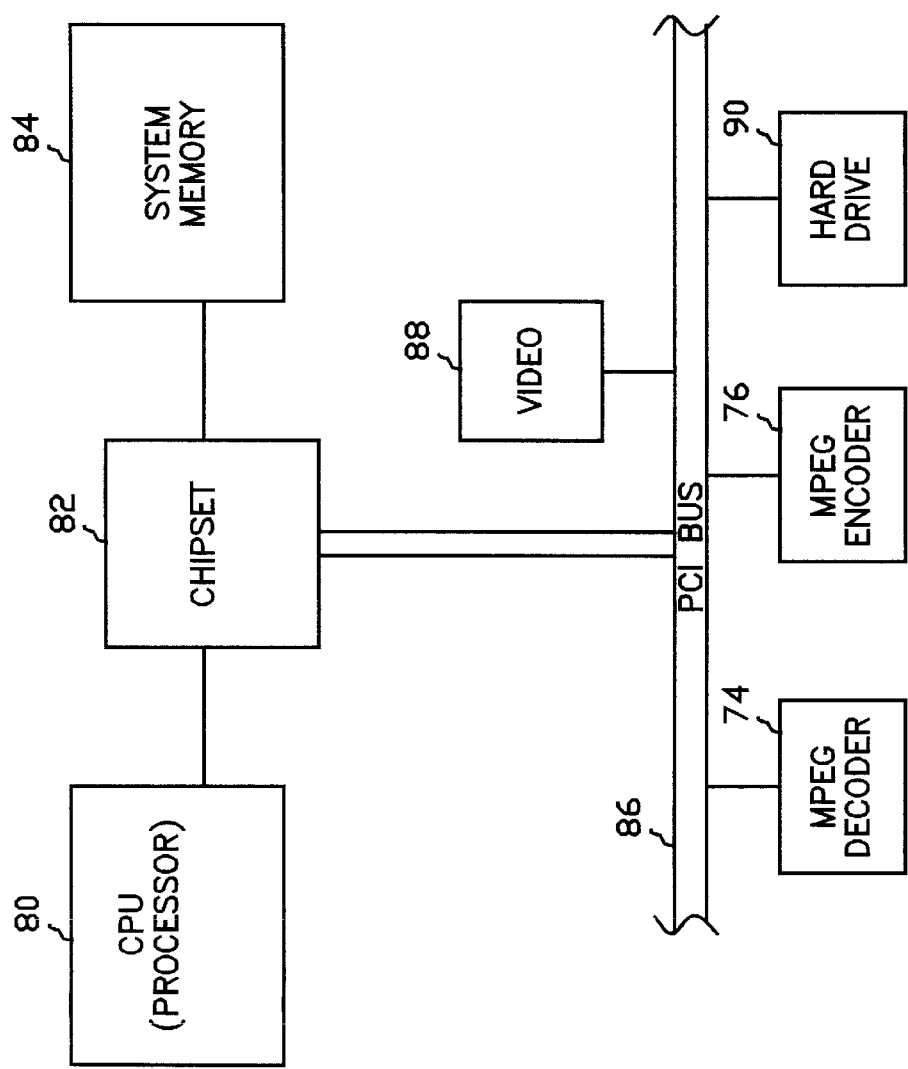
FIG. 1a is a block diagram illustrating the computer system of FIG. 1.

The computer system 60 preferably includes various standard components, including one or more processors, one or more buses, a hard drive and memory. Referring now to FIG. 1a, a block diagram illustrating the components comprised in the computer system of FIG. 1 is shown. It is noted that FIG. 1a is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86. MPEG decoder 74 and MPEG encoder 76 are shown connected to PCI bus 86. In an alternate embodiment, MPEG decoding and encoding is performed in software. Various other components may be comprised in the computer system, such as video 88 and hard drive 90.

Referring again to FIG. 1, in the preferred embodiment the computer system 60 includes or is coupled to one or more digital storage or media storage devices. For example, in the embodiment of FIG. 1, the computer system 60 couples to a media storage unit 62 through cable 64. The media storage unit 62 includes one or more CD-ROM drives and/or one or more Digital Video Disk (DVD) storage units for storing digital video. The computer system may also include one or more internal CD-ROM drives or may couple to one or more separate Digital Video Disk (DVD) storage units. The computer system 60 also may connect to other types of digital or analog storage devices, as desired.

The compressed normal play bitstream may be comprised on a storage media, such as a CD-ROM or Digital Video Disk (DVD). In this embodiment, the storage media which includes the compressed normal play bitstream is inserted into the respective storage device comprised in or coupled to the computer system 60, and the computer system 60 reads the compressed normal play bitstream from the storage media. For example, the compressed normal play bitstream may be comprised on a CD-ROM, and the CD-ROM is inserted into the CD-ROM drive of the media storage unit 62 or the computer system 60 to enable the computer system 60 to access the compressed normal play bitstream. Also, the compressed normal play bitstream may be comprised on a DVD, and the bitstream is read from the DVD by the computer system 60.

Alternatively, the compressed normal play bitstream may be received from an external source, such as a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the compressed normal play bitstream. The compressed normal play bitstream may also be stored or received in analog format and converted to digital data, either externally to the computer system 60 or within the computer system 60.

As mentioned above, the computer system 60 generates trick play video streams from a compressed normal play bitstream. As discussed further below, the computer system 60 performs filtering and verifier/fixer functions, as well as MPEG-2 decoding and encoding functions. In the preferred embodiment, the filtering and verifier/fixer functions are performed by the computer system 60 in software, wherein the software is represented by floppy disks 72. In an alternate embodiment, the computer system 60 includes dedicated hardware which performs one or both of the filtering and verifier/fixer functions.

In the embodiment of FIG. 1, the computer system 60 preferably includes a hardware MPEG (MPEG-2) decoder card 74 and a hardware MPEG (MPEG-2) encoder card 76. The MPEG decoder 74 and MPEG encoder 76 comprise adapter cards coupled to a bus in the computer system, but are shown external to the computer system 60 in FIG. 1 for illustrative purposes. Alternatively, one or both of the MPEG decoder and MPEG encoder are external to the computer system 60. In an alternate embodiment, the computer system 60 performs one or both of MPEG decompression and MPEG compression in software, wherein the software is represented by floppy disks 72. In this embodiment the computer system 60 does not include a hardware MPEG decoder or MPEG encoder.

It is noted that the system for generating trick play video streams may comprise two or more interconnected computers, as desired. The system for generating trick play video streams may also comprise dedicated hardware, either alone or used in conjunction with a general purpose programmable computer. It is noted that any of various types of systems may be used for generating trick play video streams according to the present invention, as desired.

Flow Diagram

Figure 2:
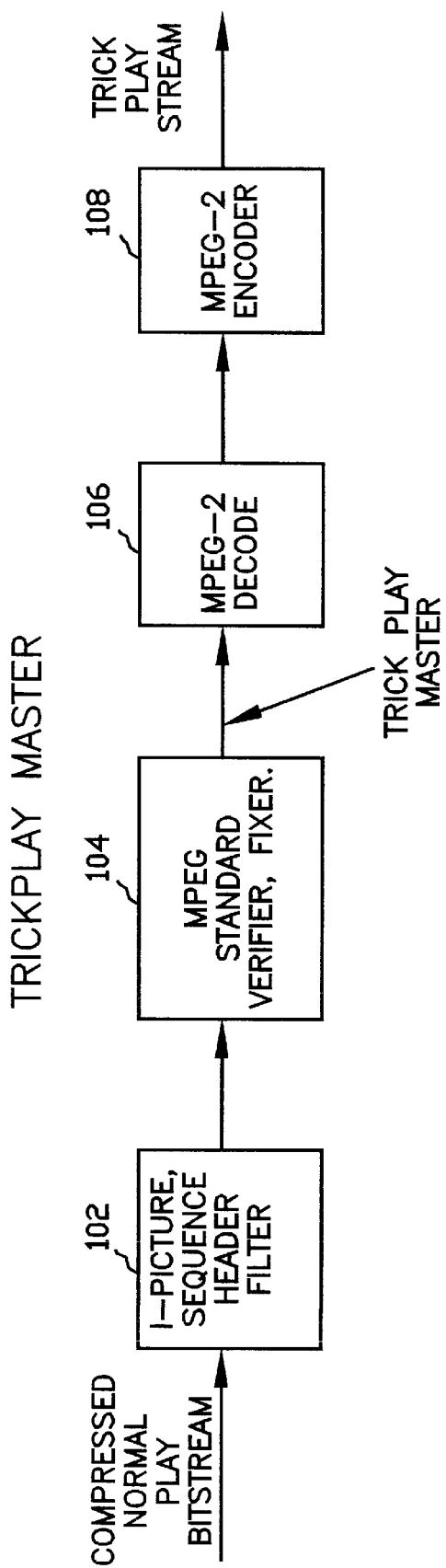
FIG. 2 is a flow diagram illustrating operation of the present invention.

Referring now to FIG. 2, a diagram illustrating operation of the present invention is shown. As shown, the present invention includes a Filter operation 102, a Verifier/Fixer operation 104, an MPEG-2 decode operation, and an MPEG-2 encode operation. As discussed above, each of these operations may be performed in either hardware or software, as desired.

As shown, the system of the present invention receives a normal play bitstream. The normal play bitstream is a bitstream of video data which is used to present a video sequence, such as a television segment or movie, onto a screen, such as a television or a computer system. In the preferred embodiment, the normal play bitstream is a compressed bitstream. The compressed normal play bitstream is preferably an MPEG compressed bitstream, preferably an MPEG-1 or MPEG-2 compressed bitstream. Other types of compression may be used, as desired.

As shown, the present invention includes a Filter 102, referred to as the "I-picture, Sequence Header Filter" which filters the compressed bitstream. The Filter 102 saves only portions of the bitstream, i.e., removes or deletes portions of the MPEG data stream. More exactly, the Filter 102 extracts and stores the I-frames and the sequence headers, as well as all weighting matrices, from the MPEG bitstream and stores this information in a new file. Thus, the Filter 102 removes all of the MPEG video data except the I-frames, sequence headers and weighting matrices. The Filter 102 thus deletes portions of the MPEG data stream, including the Predicted (P) frames and Bi-directional (B) frames As discussed above, an MPEG encoded bitstream includes a plurality of I-frames which are intracoded pictures, and a plurality of B and P frames which are interceded frames. The I frames each contain video data for an entire frame of video and are placed periodically in the sequence. The P and B frames include change information relative to prior or subsequent frames. Each picture or frame also includes a picture header which identifies the frame and includes information for that frame. An MPEG encoded bitstream further includes one or more sequence headers which include certain information regarding the video sequence, including the frame rate and the picture size, among other information.

An MPEG encoded stream also includes weighting matrixes which are used for reconstructing the pixel values from the DCT coefficients in the MPEG bitstream. Each weighting matrix comprises a matrix of coefficients which are applied to different parameters of the Discrete Cosine Transform (DCT) used in encoding the frame. The matrices in the decoder are reinitialized at the beginning of every video sequence, and these values are used for the respective frames until a subsequent new weighting matrix appears in the MPEG stream. It is noted that an MPEG encoded stream includes both inter frame and intra frame matrices. The trickplay generation system and method only utilizes the intra frame matrices in generating trick play streams.

The weighting matrices are typically included in the picture header for each I frame, or in a sequence header before the respective I frame. However, in some cases the weighting matrix for a respective I frame may not be included in the I frame picture header or in a sequence header, but rather may be comprised in a prior P or B frame. In other words, in some instances the new values of a weighting matrix for a respective I-frame may be included in a prior P or B frame. This occurs where the P or B frame includes one or more macroblocks that are encoded with an I frame syntax. Thus the Filter 102 examines P and B frames for weighting matrices and stores these matrices for use by the Verifier/Fixer block 104.

As shown, the Filter 102 provides a stored output comprising portions of the MPEG stream to a Verifier/Fixer 104. The Verifier/Fixer 104 assembles or collates the data generated by the Filter 102 into a single bitstream. The Verifier/Fixer 104 assembles or concatenates the stored data into the proper order to generate an assembled bitstream. The Verifier/Fixer 104 uses information provided by the Filter 102 to ensure that the sequence headers correspond to the appropriate I frames.

The Verifier/Fixer 104 also ensures that weighting matrices found in the stream, such as in a P or B frame, are included in the associated stream and properly correspond to the respective I-frames. In other words, the Verifier/Fixer 104 also ensures that the weighting matrixes or quantization matrix changes are properly incorporated into the new assembled bitstream. In the preferred embodiment, the Verifier/Fixer 104 creates new sequence headers for weighting matrices found in P and B frames and concatenates these new sequence headers with the correct I frames.

For a fast forward trick play stream, the assembled bitstream comprises the sequence headers, I frames, and respective weighting matrices in the proper time or sequence order as they appeared in the original MPEG stream. For a fast reverse trick play bitstream sequence, the Verifier/Fixer 104 reverses the order of the sequence header/I frame groupings or tuples to produce a reverse play sequence. Thus, the Verifier/Fixer 104 also reorders the sequence header/I frame tuples in a reverse order to ensure that the matrixes correspond to the respective I-frames.

Thus, the output of the Verifier/Fixer 104 is an assembled bitstream comprised of a plurality of sequence headers and I-frames. The Verifier/Fixer 104 thus produces a resulting bitstream that is a valid MPEG encoded bitstream.

This output assembled bitstream is provided to a decoder block 106, preferably an MPEG-2 decoder block 106. The MPEG-2 decoder block 106 decodes the assembled bitstream, i.e., each of the respective 1-frames, to produce a new video sequence. The new video sequence is an uncompressed sequence and comprises only one out of every X pictures of the original uncompressed normal play stream. Thus, if the original normal play bitstream included I frames at a frequency of 1 every X frames, the new video sequence comprises only one of every X pictures or frames of the original, uncompressed normal play bitstream. For example, if the original MPEG-2 compressed bitstream received at the input of the filter included an I-frame every 7 frames, the MPEG-2 decoder block 106 produces a bitstream comprising non-compressed video data, but including only one of every seven frames of the original uncompressed bitstream.

This output picture stream is then provided to an encoder block 108, where the stream is re-encoded with respective MPEG parameters desired for the trickplay stream. These MPEG parameters include the bit rate, picture size, as well as others. In the preferred embodiment, the encoder block 108 encodes the stream with a smaller picture size and lower data rate than the normal play stream for reduced data storage and transfer bandwidth.

The MPEG-2 encoder 108 produces a trickplay stream that is a valid MPEG encoded stream, but which includes only one of every X frames of the original stream. Thus the trick play stream output from the encoder 108 includes I frames, P frames and B frames. When this new MPEG encoded trick play stream is subsequently transferred to a user and decoded by an MPEG decoder, the resulting bitstream comprises a stream which includes only one of every X frames of the original, uncompressed normal play bitstream.

Figure 3:
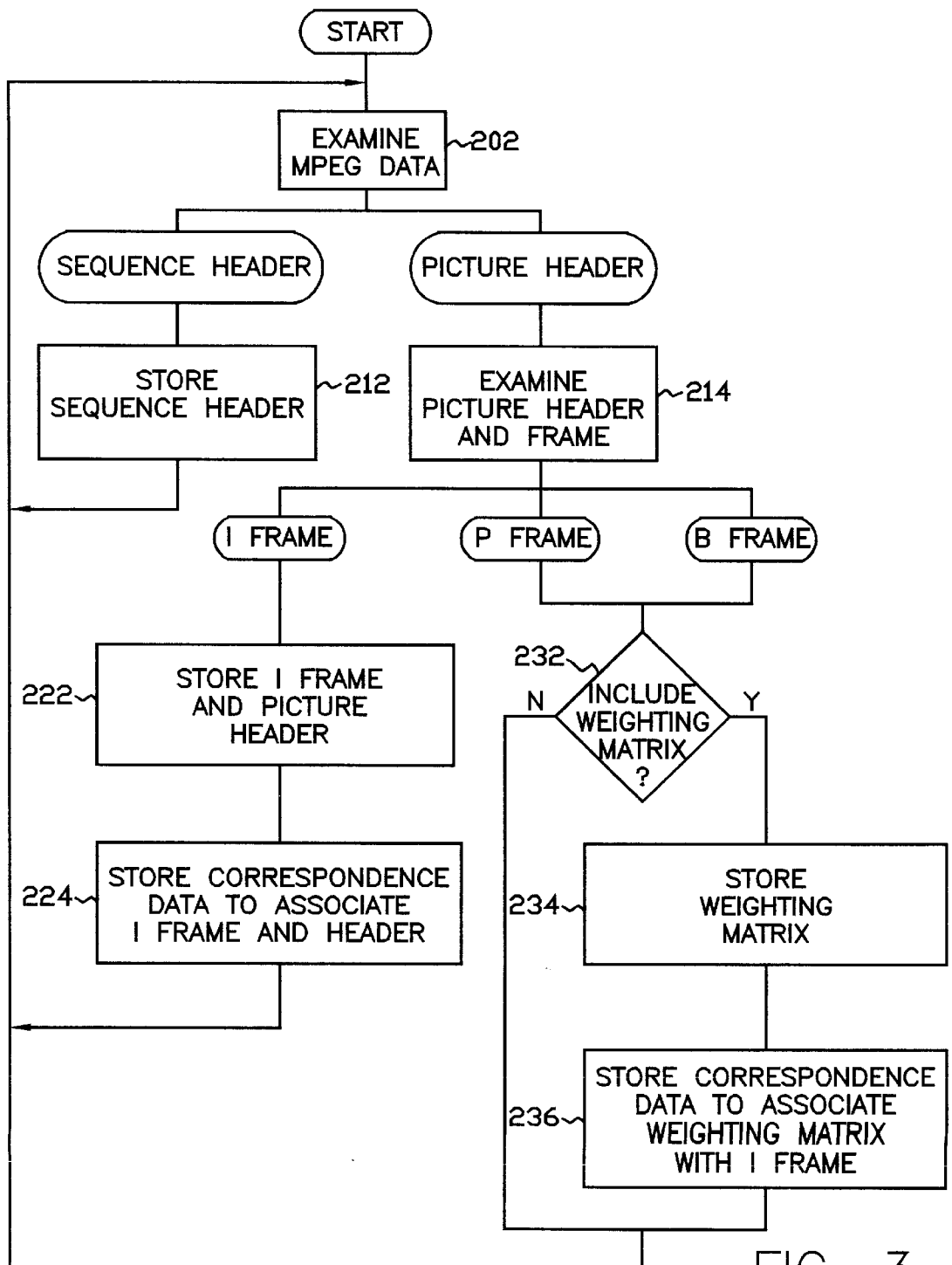
FIG. 3 is a flowchart diagram illustrating operation of the Filter of FIG. 2.

FIG. 3—Filter Flowchart Diagram

Referring now to FIG. 3, a flowchart diagram illustrating operation of the Filter 102 according to one embodiment is shown. In step 202 the Filter 102 examines a block of MPEG data. Here it is assumed that the block of MPEG data is either a sequence header or a picture header. If the MPEG data being examined is a sequence header, in step 212 the Filter 102 stores the sequence header. The Filter 102 then returns to step 202 and begins examining the next block of MPEG data.

If the frame or data being examined in step 202 is a picture header or picture, then in step 214 the Filter 102 examines the picture header and the subsequent frame which corresponds to the picture header. If the frame or data being examined is an I frame, in step 222 the Filter 102 stores the picture header and I frame. The Filter 102 also preferably stores correspondence data in step 224 indicating the respective sequence header or picture header which corresponds to the I frame being stored. After storing the I frame and the correspondence data, the Filter 102 returns to step 202 to examine the next block of MPEG data.

If the frame being examined is a P or B frame, in step 232 the Filter 102 determines if the respective P or B frame includes a weighting matrix. If not, then the P or B frame data is not stored, and the Filter 102 returns to step 202 to examine the next block of MPEG data. If the P or B frame being examined includes a weighting matrix, then in step 234 the Filter 102 stores the weighting matrix. In step 236 the Filter 102 associates the weighting matrix with the respective I frame, i.e., the subsequent I frame. In step 236 the Filter 102 also preferably stores correspondence data indicating the respective I frame which corresponds to the weighting matrix. After the Filter 102 stores the weighting matrix and the correspondence data, the Filter 102 returns to step 202 to examine the next block of MPEG data.

Thus, the Filter 102 examines all of the headers and frames in an MPEG stream. This is necessary since a weighting matrix can occur in any header or frame in the MPEG stream. The Filter 102 stores only sequence headers and I frames, as well as weighting matrices that are located elsewhere in the MPEG stream, such as in P or B frames. The Filter 102 does not store P frame or B frame data. The Filter 102 also associates sequence headers and weighting matrices with the respective corresponding I frames.

Thus, if a matrix is included in one of the intervening P or B frames, the Filter 102 stores this matrix in a file for use when the trick playmaster sequence is being reconstructed. As discussed further below, during construction of the trickplay stream, the present invention generates a dummy sequence header or otherwise inserts the new matrix into the assembled bitstream.

After a sequence header or frame has been examined, the Filter 102 examines the next piece of MPEG data, and this operation repeats. Likewise the Filter 102 examines every header and frame in the MPEG sequence, storing sequence headers, I frames, and weighting matrices, and not storing P and B frames. Thus the Filter 102 stores a portion of the MPEG data stream comprising only sequence headers, picture headers, I frames, a and weighting matrices.

In one embodiment, the results of the Filter 102 are concatenated to produce the trick play bitstream. However, it is noted that if the results of the Filter 102 are simply concatenated, the bitstream will not be a valid MPEG bitstream. In the preferred embodiment, the present invention generates an MPEG compressed bitstream, since it is desired that the resulting trickplay bitstream be able to pass through a standard MPEG decoder.

Figure 4:
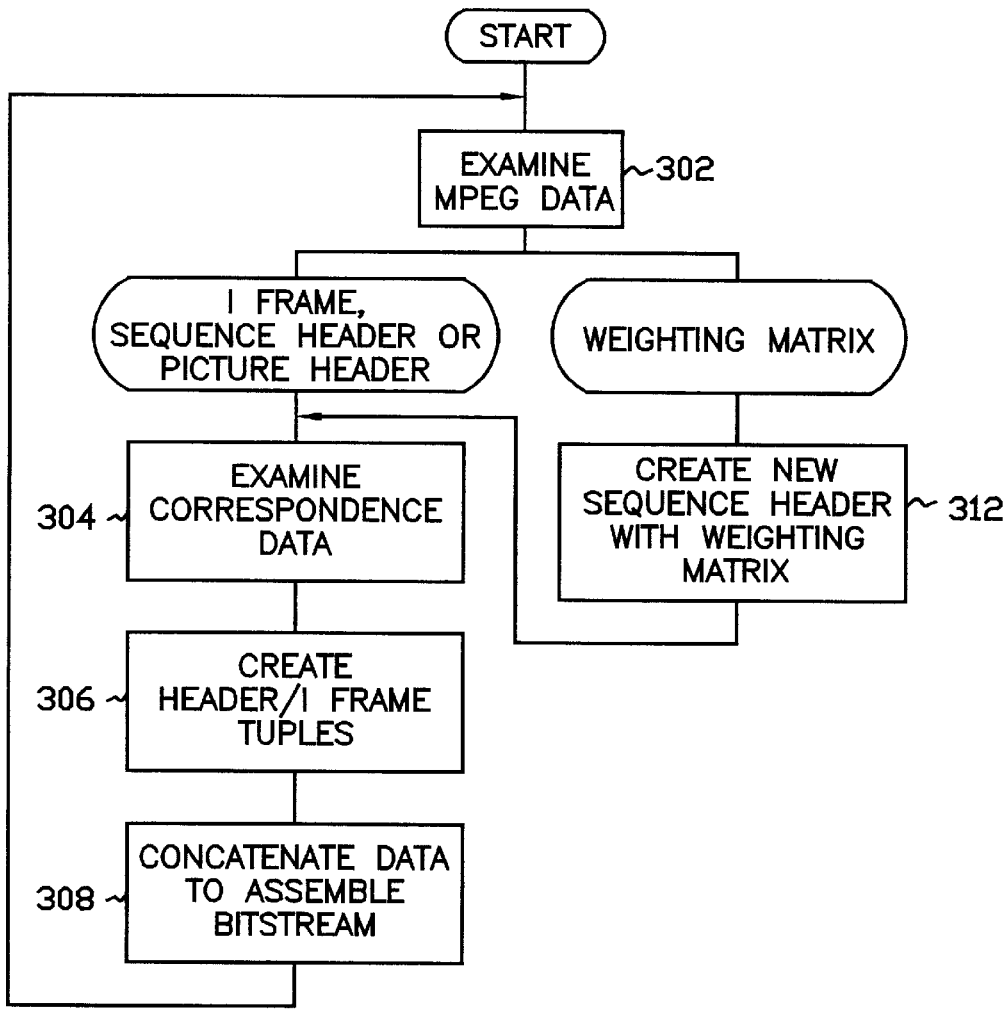
FIG. 4 is a flowchart diagram illustrating operation of the Verifier/Fixer of FIG. 2.

FIG. 4—Verifier/Fixer Flowchart Diagram

Referring now to FIG. 4, a flowchart diagram illustrating operation of the Verifier/Fixer 104 assembling a trick play stream is shown. In step 302 the Verifier/Fixer 104 examines a stored block of MPEG data, i.e., a block of MPEG data stored by the Filter 102. Here it is noted that the block of MPEG data is either a sequence header, a picture header, an I frame, or a weighting matrix. If in step 302 the MPEG data being examined by the Verifier/Fixer 104 is a sequence header, a picture header, or an I frame, in step 304 the Verifier/Fixer 104 examines the correspondence data g generated by the Filter 102 to associate the picture header or sequence header with the appropriate I frame. In step 306 the Verifier/Fixer 104 groups or concatenates I frames and their respective picture headers and/or sequence headers, wherein these groupings are referred to as header/I frame tuples. In step 308 the Verifier/Fixer 104 concatenates the new header/I frame tuple to the bitstream being assembled to assemble the new bitstream. After step 308 is performed, the Verifier/Fixer 104 returns to step 302 to examine the next stored block of MPEG data, and operation repeats.

If the system is generating a fast forward stream, then in step 308 the Verifier/Fixer 104 concatenates groupings of I frames and their respective picture headers and/or sequence headers, referred to as header/I frame tuples, in a forward time order, i.e., the time order in which they appeared in the original stream. If the system is generating a fast reverse stream, then in step 308 the Verifier/Fixer 104 concatenates the header/I frame tuples in a reverse time order. Thus it is noted that, for a fast reverse sequence, picture headers and sequence headers which correspond to respective I frames are still concatenated prior in time to their respective I frames. However, the header/I frame groupings or tuples are concatenated in reverse time order.

If in step 302 the MPEG data being examined by the Verifier/Fixer 104 is a weighting matrix, in step 312 the Verifier/Fixer 104 preferably creates a new sequence header comprising the weighting matrix. The Verifier/Fixer 104 then advances to step 304 where the Verifier/Fixer 104 examines the correspondence data generated by the Filter 102 and in step 306 groups the new sequence header with the respective I frame. In step 306 the Verifier/Fixer 104 places the newly created sequence header prior to the corresponding I frame. In step 308 the Verifier/Fixer 104 concatenates the new sequence header/I frame tuple to the bitstream being assembled to assemble the new bitstream.

If an I frame does not have a weighting matrix, the Verifier/Fixer 104 uses the weighting matrix from a prior I-frame, or a default value. In the preferred embodiment, the default matrix used is implicitly determined by virtue of the fact that the stream does not explicitly contain a matrix, and this operation is part of the MPEG standard.

Alternate Embodiments

In a first alternate embodiment of the invention, for fast forward trick play streams the trick play generation system includes P frames as well as I frames in the fast forward trick play stream. This embodiment is preferably used for 2×, 3×, or 4× fast forward trick play streams, preferably 3× fast forward streams. In this embodiment, the system examines the MPEG stream for interframe matrices in B frames and moves these interframe matrices to subsequent P frames. It is noted that this embodiment is only possible for forward trick play streams, since P frames in the original MPEG stream only comprise changes relative to prior P frames.

Figure 5:
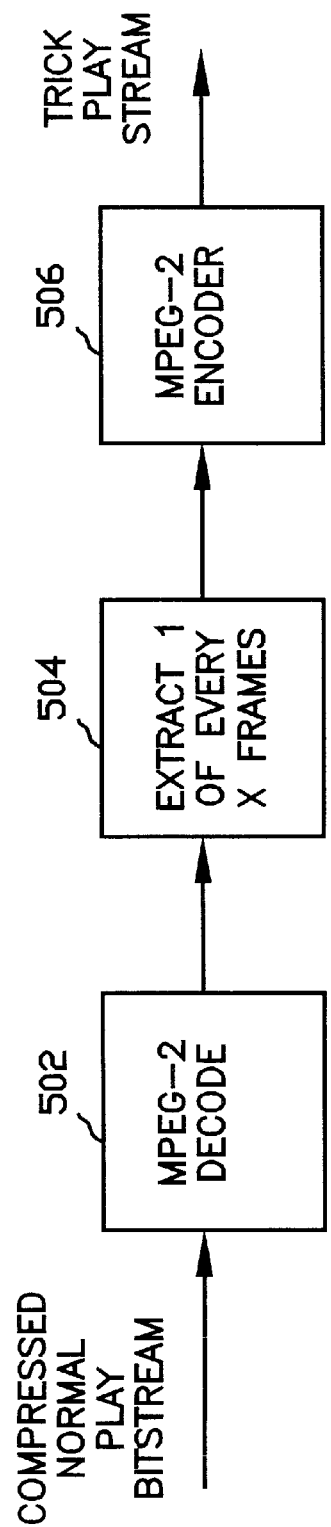
FIG. 5 is a flowchart diagram illustrating operation of the present invention according to an alternate embodiment.

Referring now to FIG. 5, a diagram illustrating operation of the present invention according to another alternate embodiment is shown. As shown, this embodiment of the present invention includes an MPEG-2 decode operation 502, an extraction operation 504, and an MPEG-2 encode operation 506. Each of these operations may be performed in either hardware or software, as desired.

As shown, the system of the present invention receives a normal play bitstream, preferably an MPEG compressed normal play bitstream. This compressed normal play bitstream is provided to a decoder block 502, preferably an MPEG-2 decoder block 502. The MPEG-2 decoder block 502 decodes each of the respective frames to produce the original uncompressed video sequence. The original uncompressed video sequence is then provided to an Extraction block 504 which operates to extract 1 of every X frames of the video sequence. The Extraction block 504 also concatenates these extracted frames in either a forward or reverse time order. These concatenated frames thus comprise a bitstream which comprises only one out of every X pictures of the original uncompressed normal play stream. Thus, if the original normal play bitstream included I frames at a frequency of 1 every X frames, the new video sequence comprises only one of every X pictures or frames of the original, uncompressed normal play bitstream.

This output picture stream is then provided to an encoder block 506, where the stream is re-encoded with respective MPEG parameters desired for the trickplay stream. These MPEG parameters include the bit rate, picture size, as well as others. The MPEG-2 encoder 506 produces a trickplay stream that is a valid MPEG encoded stream, but which includes only one of every X frames. When this new MPEG encoded trick play stream is subsequently transferred to a user and decoded by an MPEG decoder, the resulting bitstream comprises a stream which includes only one of every X frames of the original, uncompressed normal play bitstream.

Reverse Trick Play Stream Generation—Alternate Embodiment

Figure 6A:
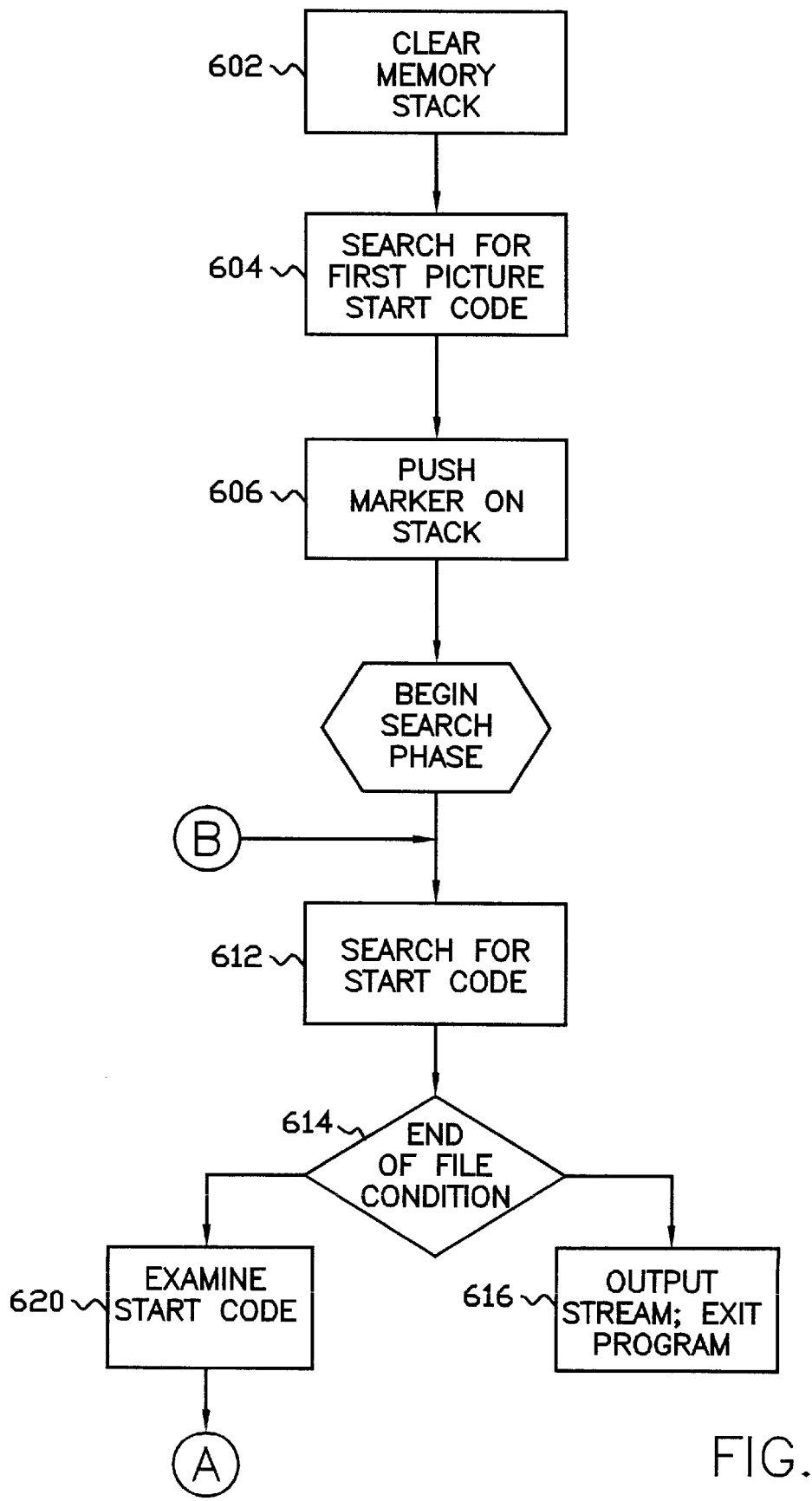
FIGS. 6A–6C are a flowchart diagram of a preferred embodiment for generating a reverse trick play stream according to the present invention.
Figure 6B:
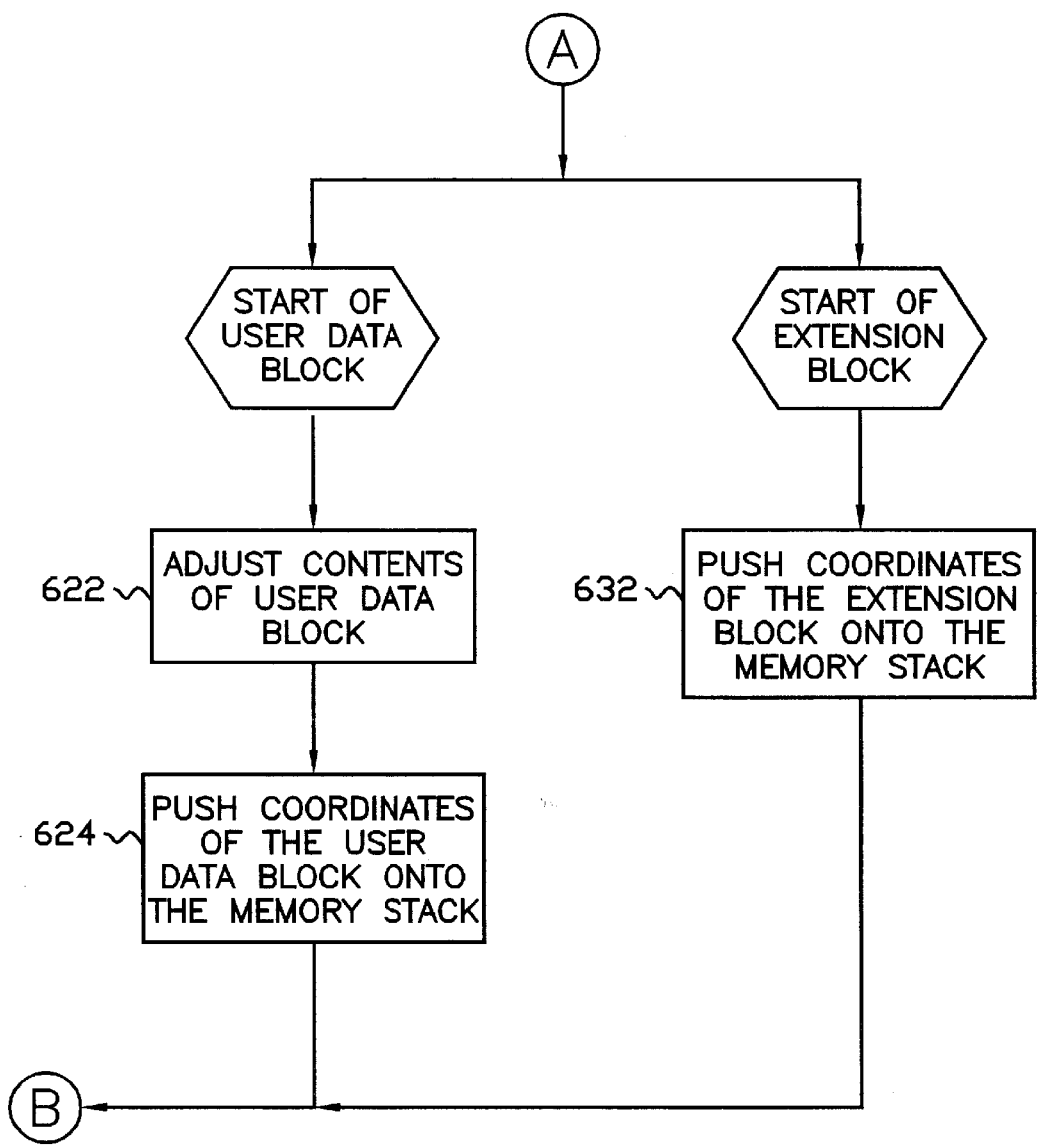
Figure 6C:
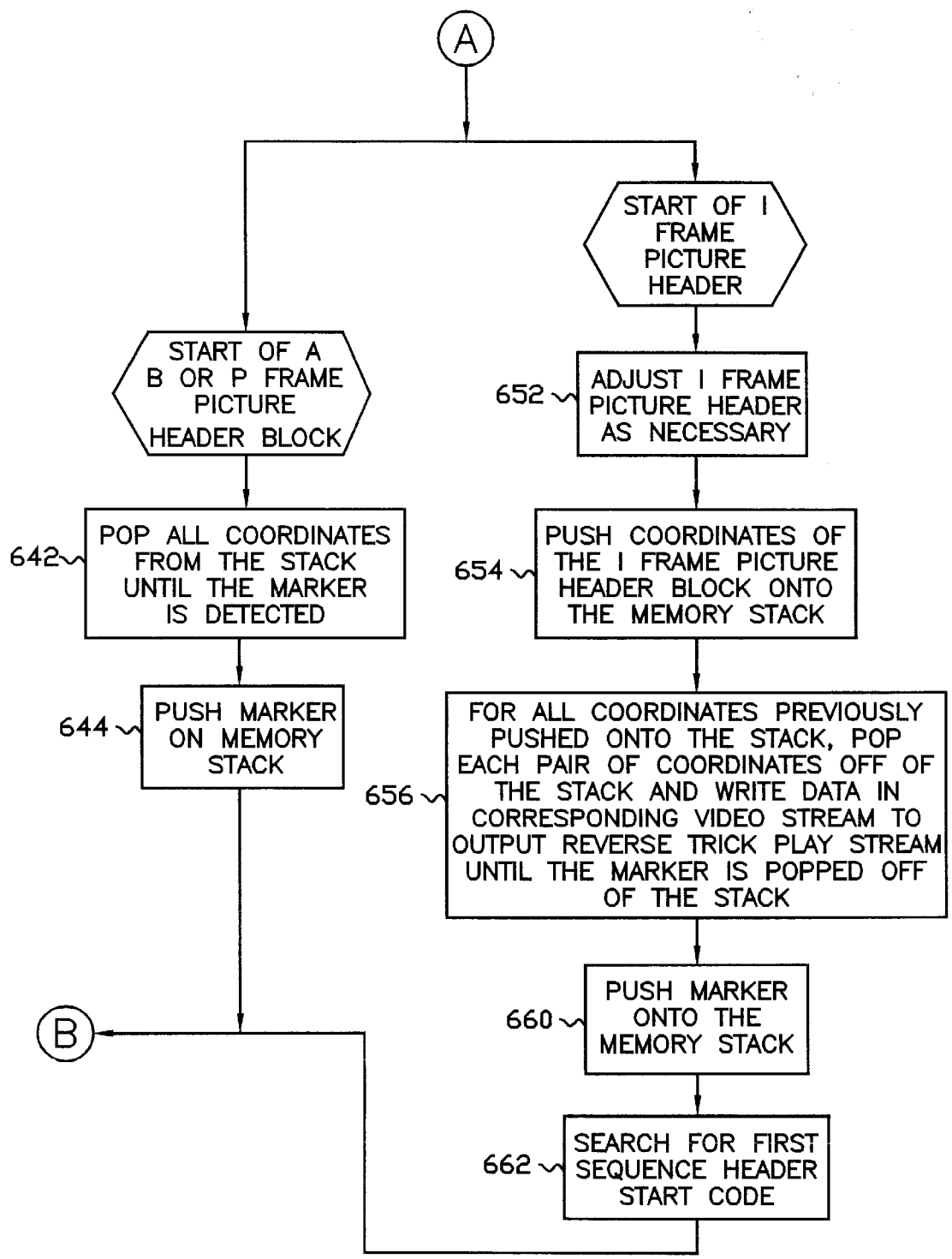

Referring now to FIG. 6, an alternate and preferred embodiment for generating a reverse trick play stream according to the present invention is shown. FIG. 6 is shown in three portions referred to as FIGS. 6A, 6B, and 6C for convenience. In the embodiment of FIG. 6, the reverse trick play stream is generated by scanning the video stream from the end to the beginning. This embodiment also uses a memory stack which temporarily stores groupings or tuples of MPEG data so that they are incorporated into the reverse play trick stream in the proper order.

As shown in FIG. 6, in step 602 an initialization phase is performed where the stack is cleared. In step 604 a search is then performed for the first picture start code in the video sequence. In step 604 the search is performed from the end to the beginning of the video stream. When the first picture start code is found, searching from the end to the beginning, in step 606 a marker is pushed onto the stack. As discussed further below, this marker is used to identify different blocks or portions of the video stream. After step 606, the search phase commences.

In step 612 the method searches for a start code in the video stream. In step 614 the method determines if an end of file condition is found during the search for the start code in step 612. If so, then in step 616 the output stream is closed, the program is exited and operation completes. If an end of file condition is not found in step 614, then in step 620 the method presumably examines the start code in the video stream.

It is noted that the start code found may comprise the start of a user data block, the start of an extension block, the start of a B or P frame picture header block, or the start of an I frame picture header. As shown in FIG. 6, different operations are performed depending on what type of start code is examined in step 620. It is noted that the oval blocks in FIG. 6 comprise headings and are non-functional steps.

If the start code examined in step 620 is the start of a user data block, then in step 622 the method adjusts the contents of the user data block as necessary. The contents of the user data block are adjusted to conform to possible new parameters used in preparing the trick play streams as mentioned above. After the contents are adjusted in step 622, in step 624 the method pushes the coordinates of the user data block onto the stack. Operation then returns to step 612 where a search for a new start code is performed as described above.

If the start code examined in step 620 is the start of an extension block, then in step 632 the method pushes the coordinates of the extension block onto the stack. The method then returns to step 612 to search for the next start code.

If the start code examined in step 620 is the start of a B or P frame picture header block, then in step 642 the method pops all of the coordinates off of the stack until the marker is detected. In other words, if the start of the B or P frame picture header block is detected, then all of the coordinates on the stack above the marker are removed or popped from the stack in step 642. After this, in step 644 the marker is then pushed or returned back onto the stack. Operation then returns to step 612 where a search for a new start code is conducted as described above.

If the start code examined in step 620 is the start of an I-frame picture header, then in step 652 the method adjusts the I-frame picture header information as necessary. The I-frame picture header information is adjusted to conform to possible new parameters used in preparing the trick play streams, as mentioned above. After adjusting the I frame picture header, in step 654 the method pushes the coordinates of the I-frame picture header block onto the stack. In step 656 the method then pops or removes the coordinates that are pushed onto the stack until the marker is detected. Also, in step 656 the method writes the data in the corresponding video stream to the output reverse trick play stream as each set of coordinates is popped. Thus for all coordinates previously pushed on to the stack, each pair of coordinates is popped off the stack, and data in the corresponding video stream is written to the output reverse trick play stream until the marker is popped off the stack.

After all of the coordinates have been popped from the stack and have been written to the output reverse trick play stream in step 656, then in step 660 the method pushes the marker back onto the stack. In step 662 the method then searches for the first sequence header start code. When this first sequence header start code is found, then the method returns to step 612 to again search for next start code, and operation repeats as described above.

Therefore, the present invention comprises a system and method for generating trick play video streams from a compressed normal play video stream. The present invention examines each header or frame in an MPEG sequence and stores the sequence headers, I frames and associated weighting matrices. The system then intelligently assembles a new fast forward or fast reverse bitstream comprising these stored components. The new assembled bitstream is then decoded to generate a plurality of uncompressed frames. These uncompressed frames are then re-encoded according to the MPEG standard to produce a new MPEG stream which is a trick play fast forward or fast reverse stream.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for generating trick-play streams from a compressed normal play bitstream, comprising:

receiving a compressed normal play bitstream, wherein said compressed normal play bitstream includes a plurality of intracoded frames and a plurality of intercoded frames;

extracting said intracoded frames from said compressed normal play bitstream, wherein said extracting includes storing said intracoded frames in a storage memory;

assembling said intracoded frames to form an assembled bitstream after said extracting;

decoding said assembled bitstream to produce a plurality of uncompressed frames; and encoding said plurality of uncompressed frames after said decoding to produce a compressed trick play bitstream, wherein said compressed trick play bitstream includes only a subset of frames of said normal play bitstream.

2. The method of claim 1, wherein said compressed normal play bitstream includes the plurality of intracoded frames at a specified frequency;

wherein said extracting comprises extracting data bits corresponding to said intracoded frames at said specified frequency.

3. The method of claim 1, wherein said compressed normal play bitstream includes a plurality of sequence headers which comprise information for at least a plurality of said intracoded frames;

wherein said extracting comprises extracting said sequence headers from said compressed normal play bitstream, wherein said extracting includes storing said sequence headers in a storage memory; and wherein said assembling comprises assembling said sequence headers and said intracoded frames to form said assembled bitstream.

4. The method of claim 1, wherein said method generates a trick play fast forward bitstream;

wherein said assembling comprises assembling said intracoded frames in a forward time order.

5. The method of claim 1, wherein said method generates a trick play fast reverse bitstream;

wherein said assembling comprises assembling said intracoded frames in a reversed time order.

6. The method of claim 1, wherein said compressed normal play bitstream includes a plurality of matrices which correspond to said intracoded frames;

the method further comprising:

locating said matrices in said compressed normal play bitstream;

wherein said assembling said intracoded frames to form said assembled bitstream includes including said matrices in said assembled bitstream.

7. The method of claim 6, wherein each of said plurality of matrices correspond to one of said intracoded frames;

wherein said assembling comprises assembling respective ones of said matrices with corresponding ones of said intracoded frames.

8. The method of claim 1, wherein said compressed normal play bitstream is an MPEG compressed bitstream;

wherein said decoding said assembled bitstream comprises MPEG decoding said assembled bitstream to produce said plurality of uncompressed frames; and wherein said encoding said plurality of uncompressed frames comprises MPEG encoding said plurality of uncompressed frames to produce an MPEG compressed trick play bitstream.

9. A system for generating trickplay streams from a compressed normal play bitstream, comprising:

a storage media storing a compressed normal play bitstream, wherein said compressed normal play bitstream includes a plurality of intracoded frames and a plurality of interceded frames;

a filter for extracting said intracoded frames from said compressed normal play bitstream;

a storage memory for storing said extracted intracoded frames;

a verifier/fixer for assembling said stored intracoded frames to form an assembled bitstream;

a decoder which decodes said assembled bitstream to produce a plurality of uncompressed frames; and an encoder which encodes said plurality of uncompressed frames to produce a compressed trick play bitstream, wherein said compressed trick play bitstream includes only a subset of frames of said normal play bitstream.

10. The system of claim 9, wherein said compressed normal play bitstream includes the plurality of intracoded frames at a specified frequency;

wherein said filter extracts data bits corresponding to said intracoded frames at said specified frequency.

11. The system of claim 9, wherein said compressed normal play bitstream includes a plurality of sequence headers which comprise information for at least a plurality of said intracoded frames;

wherein said filter extracts said sequence headers from said compressed normal play bitstream, and stores said sequence header in said storage memory; and wherein said verifier/fixer assembles said sequence headers and said intracoded frames to form said assembled bitstream.

12. The system of claim 9, wherein said system generates a trick play fast forward bitstream;

wherein said verifier/fixer assembles said intracoded frames in a forward time order.

13. The system of claim 9, wherein said system generates a trick play fast reverse bitstream;

wherein said verifier/fixer assembles said intracoded frames in a reversed time order.

14. The system of claim 9, wherein said compressed normal play bitstream includes a plurality of matrices which correspond to said intracoded frames;

wherein said filter locates said matrices in said compressed normal play bitstream and stores said matrices in said storage memory;

wherein said verifier/fixer assembles said intracoded frames and said matrices to form said assembled bitstream.

15. The system of claim 14, wherein each of said plurality of matrices correspond to one of said intracoded frames; wherein said verifier/fixer assembles respective ones of said matrices with corresponding ones of said intracoded frames.

16. The method of claim 9, wherein said compressed normal play bitstream is an MPEG compressed bitstream; wherein said decoder is an MPEG decoder; and wherein said encoder is an MPEG encoder.

17. A method for generating trickplay streams from an MPEG compressed normal play bitstream, comprising:
receiving a compressed normal play bitstream, wherein said compressed normal play bitstream includes a plurality of Intra frames, a plurality of Predicted frames, and a plurality of Bi-directionally predicted frames;
extracting said Intra frames from said compressed normal play bitstream, wherein said extracting includes storing said Intra frames in a storage memory;
assembling said Intra frames to form an assembled bitstream after said extracting;
decoding said assembled bitstream to produce a plurality of uncompressed frames; and
encoding said plurality of uncompressed frames after said decoding to produce a compressed trick play bitstream, wherein said compressed trick play bitstream includes only a subset of frames of said normal play bitstream.

18. A computer-implemented method for generating trickplay streams from a compressed normal play bitstream, comprising:
receiving a compressed normal play bitstream, wherein said compressed normal play bitstream includes a plurality of intracoded frames and a plurality of intercoded frames;
extracting said intracoded frames from said compressed normal play bitstream, wherein said extracting includes storing said intracoded frames in a storage memory;
assembling said intracoded frames to form an assembled bitstream after said extracting; and
storing said assembled bitstream;
wherein said compressed normal play bitstream includes a plurality of sequence headers which comprise information for at least a plurality of said intracoded frames; wherein said extracting comprises extracting said sequence headers from said compressed normal play bitstream, wherein said extracting includes storing said sequence headers in a storage memory; and wherein said assembling comprises assembling said sequence headers and said intracoded frames to form said assembled bitstream.

19. The method of claim 18, wherein said method generates a trick play fast forward bitstream;
wherein said assembling comprises assembling said intracoded frames in a forward time order.

20. The method of claim 18, wherein said method generates a trick play fast reverse bitstream;
wherein said assembling comprises assembling said intracoded frames in a reversed time order.

21. A computer-implemented method for generating trickplay streams from a compressed normal play bitstream, comprising:
receiving a compressed normal play bitstream, wherein said compressed normal play bitstream includes a plurality of intracoded frames and a plurality of interceded frames;
extracting said intracoded frames from said compressed normal play bitstream, wherein said extracting includes storing said intracoded frames in a storage memory;
assembling said intracoded frames to form an assembled bitstream after said extracting; and
storing said assembled bitstream;
wherein said compressed normal play bitstream includes a plurality of matrices which correspond to said intracoded frames; the method further comprising:
locating said matrices in said compressed normal play bitstream;
wherein said assembling said intracoded frames to form said assembled bitstream includes including said matrices in said assembled bitstream.

22. The method of claim 21, wherein each of said plurality of matrices correspond to one of said intracoded frames; wherein said assembling comprises assembling respective ones of said matrices with corresponding ones of said intracoded frames.

23. The method of claim 21, wherein said method generates a trick play fast forward bitstream; wherein said assembling comprises assembling said intracoded frames in a forward time order.

24. The method of claim 23, wherein said method generates a trick play fast reverse bitstream; wherein said assembling comprises assembling said intracoded frames in a reversed time order.

25. A computer-implemented method for generating trickplay streams from a compressed normal play bitstream, comprising:
receiving a compressed normal play bitstream, wherein said compressed normal play bitstream includes a plurality of intracoded frames and a plurality of intercoded frames;
extracting said intracoded frames from said compressed normal play bitstream, wherein said extracting includes storing said intracoded frames in a storage memory;
assembling said intracoded frames to form an assembled bitstream after said extracting; and
storing said assembled bitstream;
decoding said assembled bitstream to produce a plurality of uncompressed frames after said storing said assembled bitstream;
encoding said plurality of uncompressed frames after said decoding to produce a compressed trick play bitstream wherein said compressed trick play bitstream includes only a subset of frames of said normal play bitstream; and
storing said compressed trick play bitstream.

26. The method of claim 25, wherein said compressed normal play bitstream is an MPEG compressed bitstream;
wherein said decoding said assembled bitstream comprises MPEG decoding said assembled bitstream to produce said plurality of uncompressed frames; and
wherein said encoding said plurality of uncompressed frames comprises MPEG encoding said plurality of uncompressed frames to produce an MPEG compressed trick play bitstream.

27. The method of claim 25, wherein said method generates a trick play fast forward bitstream; wherein said assembling comprises assembling said intracoded frames in a forward time order.

28. The method of claim 27, wherein said method generates a trick play fast reverse bitstream; wherein said assembling comprises assembling said intracoded frames in a reversed time order.

29. A computer-readable storage media for operating in a computer system, the computer system including a central processing unit and memory, wherein the computer-readable storage media includes a substrate having a physical configuration representing data, the storage media comprising:

- an extraction program comprised on the storage media for extracting intracoded frames from a compressed normal play bitstream, wherein said extraction program stores said intracoded frames in a storage memory;
- an assembling program for assembling said intracoded frames to form an assembled bitstream;
- a decoding program for decoding said assembled bitstream to produce a plurality of uncompressed frames; and
- an encoding program for encoding said plurality of uncompressed frames after operation of said decoding program to produce a compressed trick play bitstream, wherein said compressed trick play bitstream includes only a subset of frames of said normal play bitstream.

30. The computer-readable storage media of claim 29, wherein said compressed normal play bitstream includes a plurality of sequence headers which comprise information for at least a plurality of said intracoded frames;

- wherein said extraction program extracts said sequence headers from said compressed normal play bitstream, wherein said extraction program stores said sequence headers in a storage memory; and
- wherein said assembling program assembles said sequence headers and said intracoded frames to form said assembled bitstream.

31. A computer implemented method for generating a reverse trick play stream from a compressed normal play video stream, comprising:

- receiving a compressed normal play video stream, wherein said compressed normal play video stream includes video data;
- storing a marker onto a memory stack;
- searching for a start code in the video stream, wherein said searching comprises searching from the end to the beginning of the compressed normal play video stream;
- finding a start code in the video stream in response to said searching;
- storing coordinates of a user data block onto the memory stack if said finding finds a start code of a user data block;
- storing coordinates of an extension block onto the memory stack if said finding finds a start code for an extension block;
- popping coordinates from the memory stack until the marker is detected if said finding finds a start code of a B or P frame picture header block, wherein the marker remains on the stack;
- storing coordinates of an I-frame picture header block onto the memory stack if said finding finds a start code for an I-frame picture header;
- popping coordinates currently on the memory stack until the marker is detected after said storing coordinates of the I-frame picture header block on the memory stack, if said finding finds a start code for an I-frame picture header;
- writing data from the compressed normal play video stream indicated by said coordinates removed from the memory stack to an output reverse trick play stream as said coordinates are popped from the memory stack in said popping if said finding finds a start code for an I-frame picture header;
- searching for a first sequence header start code if said finding finds a start code for an I-frame picture header; and
- repeating said searching for a start code in the video stream and subsequent steps for a plurality of times to generate said reverse trick play stream.

\* \* \* \* \*

UNITED STATES PATENT AND TRADEMARK OFFICE
CERTIFICATE OF CORRECTION

PATENT NO.     : 6,445,738 B1
DATED          : September 3, 2002
INVENTOR(S)    : Joel Zdepski, Rama Kalluri, Howard Page and Wolf-Hasso Kaubisch It is certified that error appears in the above-identified patent and that said Letters Patent is hereby corrected as shown below:

<u>Title page,</u>
Item [73], Assignee, the Assignee should be identified as -- Open TV, Inc., Mountain View, CA and Sun Microsystems, Inc., Palo Alto, CA. --

Signed and Sealed this

Seventeenth Day of December, 2002

JAMES E. ROGAN
*Director of the United States Patent and Trademark Office*